United States Patent Office 2,737,006
Patented Mar. 6, 1956

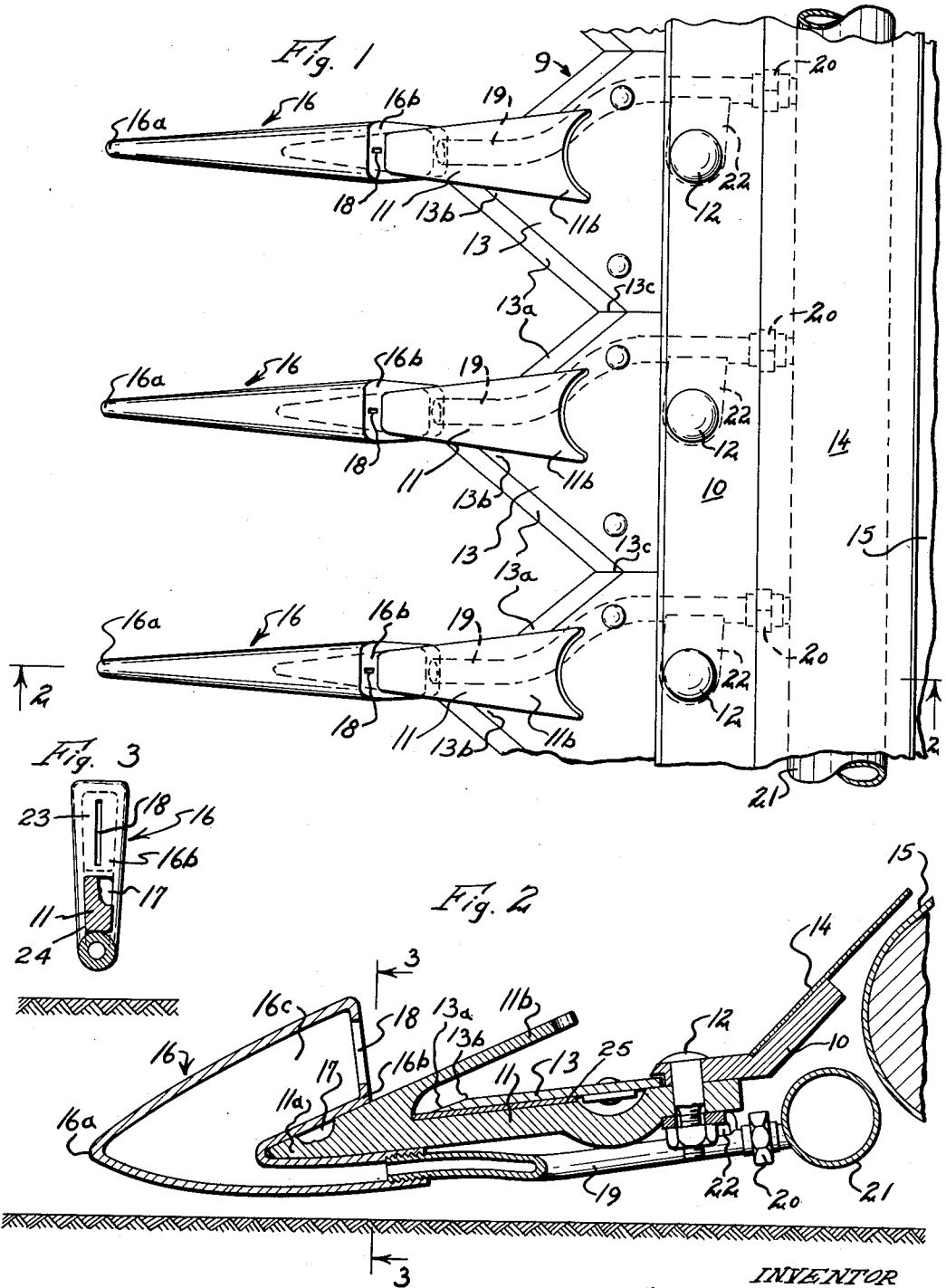

2,737,006

AIR-CONVEYING ATTACHMENT FOR SEED CROP HARVESTERS AND THE LIKE

Jerome J. Klingler, New Ulm, Minn.

Application February 26, 1954, Serial No. 412,732

4 Claims. (Cl. 56—158)

This invention relates to harvesting and crop cutting machinery, and more specifically relates to an attachment for the guards of the reciprocating cutter mechanism.

While the invention has wide use for various stalk crops including cereal grain, it is of particular importance and value in the harvesting of soy beans. Soy beans grow in pods which are attached to vines. When the beans are ready to be harvested, the pods are generally somewhat brittle and are easily shattered. A light impact is all that is necessary to break the brittle pod open and spill out the beans. In that soy beans have a high value, the loss of only a few beans in every square foot of a field will result in a substantial loss of income if the field is very large.

As a general rule, soy beans are harvested with a combine. The combine has a sickle knife which cuts off the vines with the pods attached thereto. Then the vines and pods fall rearwardly of the sickle knife onto an endless conveyor belt which carries them into the thresher. The sickle knife is moving rapidly back and forth, and very often it will hit one of the pods carrying the beans. The pod will shatter because of the impact caused by the sickle knife and the beans will roll out. If the pod is not above the knife when it shatters, the beans will fall to the ground. If the pod is on or above the sickle knife when it shatters, the beans will roll around on top of the moving sickle knife and eventually roll off the side of the sickle knife and onto the ground. It is economically unsound to manually pick up the soy beans that are so lost.

If the shattering pods and beans shelled out therefrom can be immediately carried or swept rearwardly of the sickle knife and onto the conveyor belt or other stalk-receiving medium, they will be carried into the thresher or other desired location without substantial loss.

An object of my invention is to provide apparatus of simple and inexpensive construction and operation which will provide for the immediate air-conveying of soy beans and other seed crops from the sickle knife of a harvester to the conveyor or stalk-receiving medium thereof.

Another object of my invention is to provide substantially improved apparatus constituting an attachment for a harvester for soy beans and the like which will cooperate with the sickle knife and conveyor to prevent loss of the harvested crop.

Still another object of my invention is to provide an improved apparatus to direct streams of air rearwardly over the sickle bar of a harvester for soy beans and the like.

A further object of my invention is to provide an attachment which is adapted to be fitted on almost all crop harvesting and cutting machines and which includes a number of auxiliary sickle bar guards, each defining an air blast passage or connection with a source of compressed air whereby the blast of air will be directed with force rearwardly over the sickle knife and crop-receiving medium to substantially prevent the loss of detached and otherwise dropping or rolling crop seeds.

These and other objects and advantages of my invention will more fully appear in connection with the following description made in connection with the accompanying drawing wherein like reference characters refer to the same parts throughout the several views and in which:

Figure 1 is a partial plan view of my apparatus;

Figure 2 is a sectional view of my apparatus taken on a vertical plane substantially at 2—2 of Figure 1 and having parts of the apparatus broken away; and Figure 3 is a section view of my apparatus taken on a vertical plane substantially at 3—3 of Figure 2 with parts of the apparatus broken away.

My invention in the form shown comprises an attachment for a crop harvesting or crop cutting machine or mechanism, such as a combine, the cutter bar assembly of which is designated in general by numeral 9. The cutter bar assembly includes a support member or cutter bar 10 which extends transversely of the direction of travel of the combine and which is generally supported at one end by the combine and at its other end by a skid which travels along the ground. The cutter bar assembly of the combine includes at least the cutter bar guards or guard fingers 11 and cutter knife 13. The guard fingers 11 are supported by the support member 10 and are affixed thereto by any suitable means such as a bolt and nut 12. The cutter bar guards are spaced regularly along the length of the support member 10. Each of the cutter bar guards 11 has a pointed front end 11a and has an upper plate 11b which extends upwardly and rearwardly from the pointed front end 11a thereof.

A cutter or sickle knife 13 is supported by the cutter bar guards 11 and extends longitudinally above the support member 10 and between the ends thereof. The cutter knife 13 is powered from one end thereof by the combine and source of power therein, and the cutter knife 13 is guided at its opposite end to reciprocate longitudinally of the support member 10 and transversely of the direction of travel of the combine. The cutter knife 13 has a plurality of sharpened cutting edges 13a which are disposed at an angle relative to the longitudinal extension of the cutter knife 13. Each of the sharpened edges 13a converge with the adjacent sharpened edges to form angular leading corners 13b or points and angular trailing corners 13c. The angular leading corners 13b are disposed regularly along the length of the cutter bar 13 and are spaced at a distance from each other equal to that distance which separates the cutter bar guards 11. As the combine progresses forwardly, the cutter knife 13 reciprocates transversely of the direction of travel of the combine and the sharpened cutting edges 13a engage the stalks of the crop to be harvested and cooperates with the ledger plates 25 mounted on the cutter bar guards 11 to cut such stalks.

A stalk and crop-receiving and guiding medium, such as inclined guide plate 14 and the endless conveyor belt 15, is disposed adjacent to and rearwardly of the cutter knife 13. When the crop is cut by the cutter knife 13, the stalks fall onto the plate 14 and belt 15 and are carried into the threshing apparatus of the combine.

I provide an attachment for the cutting unit of the combine comprising an air-conveying mechanism. Such mechanism comprises a plurality of auxiliary cutter bar guards 16, one of which is to be mounted on each of the cutter bar guards 11 of the combine. This is the recommended deployment of the auxiliary cutter bar guards, but in some cases fewer of the guards 16 will be satisfactory. Each of the auxiliary guards 16 is a substantially hollow housing and is made of a rigid material such as steel. Each of the auxiliary guards 16 has a substantially triangular, vertical cross-section and has a pointed forward end portion 16a and a trailing or rear vertical surface 16b at the rear end portion thereof. The width of the auxiliary cutter bar guards 16 is substantially the same as that of the cutter bar guard 11. The trailing surface 16b has an upper portion 23 and a lower portion 24. The lower portion 24 of the surface 16b has a tapered recess 17 extending forwardly therefrom and into the interior of the auxiliary guard 16. The bottom and side walls of the recess 17 are impervious, and therefore there is no communication between the recess 17 and the hollow interior or air passage 16c. The recess 17 of the auxiliary guard 16 receives the pointed front end of the cutter bar guard 11 to mount the guard 16 thereon. The upper portion 23 of the trailing vertical surface 16b has an elongated restricted slot or opening 18 extending therethrough and extending substantially vertically in the trailing vertical surface 16b.

The hollow interior 16c communicates with a tubular element or conduit 19 at the bottom and rear side of the auxiliary guard 16. The connection between the conduit 19 and the auxiliary guard 16 is below the cutter bar guard 11 and below the recess 17 of the auxiliary guard 16. The conduit 19 may be threadably connected to the auxiliary guard 16 and is connected at its other end through a coupling 20 to a manifold 21 which is connected to a source of compressed air (not shown) in the combine, such as a fan or blower.

A plate bracket 22 is fixedly attached, as by welding, to the conduit 19. The bracket has a bolt hole therein and is positioned on the conduit 19 so as to fit over bolt 12 and hold the auxiliary guard 16 in position.

In operation, the manifold 21 is supplied by a source of compressed air. The air flows through the manifold and into each of the conduits 19 which communicate with the respective hollow auxiliary guards 16. The air flows through the conduits 19 into the hollow interior chamber 16c of each of the auxiliary guards 16 and out of the elongated slot 18. Moving air is thereby directed with force toward the upper plate 11b of the cutter bar guard 11 and the air also spreads out transversely of the cutter bar guard 11 so as to pass rearwardly over the cutter bar 13. The upper plate 11b of the cutter bar guard 11 tends to effectively diffuse the streams of air directed toward it and cause them to pass laterally of the cutter bar guard 11 and rearwardly over the cutter bar 13 and between the adjacent cutter bar guards 11. With an auxiliary guard 16 on each of the cutter bar guards 11 of the combine, the entire length of the cutter knife 13 will be swept by a rearwardly moving mass of air from each of the slots 18. The slot 18 extends vertically to give the stream of air some height. Some of the air which jets out of the slot 18 will pass over the upper plate 11b of the guard 11 and will aid in carrying soy beans over the inclined plate 14.

As the combine progresses forwardly, the reciprocating cutter knife will, if the crop to be harvested is soy beans, strike some of the bean-carrying pods which are attached to the vines or stalks of the soy bean plants. When the reciprocating cutter knife 13 strikes one of the pods, the pod will shatter and break and allow the soy beans carried therein to roll out. The stream of air passing over the cutter knife 13 and supplied from the auxiliary guard 16 and the slot 18 will direct and carry the soy beans rearwardly over the cutter knife 13, rearwardly over the guide plate 14, and onto the moving endless conveyor belt 15. When soy beans are ripe and ready to be harvested, they are light enough so that they may be carried by such a stream of air. The beans which are carried by the stream of air to the conveyor belt 15 will be carried by the belt 15 into the threshing apparatus integral of the combine.

It will be seen that I have provided an attachment for crop harvesting and cutting mechanism for soy beans and the like which is of simple and inexpensive operation and construction and which will provide immediate air carrying of the seed crop from the sickle knife to the crop-receiving medium of the mechanism. Substantial loss of harvested crop will thereby be prevented.

It should also be apparent that I have provided an improved apparatus for directing a stream of air over the sickle bar of a harvester for soy beans and the like. My improved apparatus directs a stream of air in such a fashion as to successfully carry the harvested and shattered soy beans rearwardly from the sickle bar onto the adjacent conveyor belt.

It will also be obvious that I have provided a new attachment which is adapted to fit most types of crop harvesting and cutting mechanisms and which is adapted to fit on the sickle bar guards thereof to direct a stream of air over the sickle bar. Shattered soy beans and the like which would normally roll around on the sickle bar and eventually be lost on the ground, will be saved by the operation of my new attachment. The attachment is easily and readily installed on most types of harvesters and, therefore, the construction of the attachment may be standard for most harvesters. This standardization in construction will make the construction thereof more inexpensive.

It will, of course, be understood that various changes may be made in the form, details, arrangement and proportions of the parts without departing from the scope of my invention.

What I claim is:

1. A bean-saving attachment for use with a soy bean harvester of the general type employing a crop-receiving and guiding medium and a reciprocating cutter knife which is carried by suitable support structure in a position forwardly of such a medium relative to the forward direction of travel of the harvester and also employing guard fingers which have pointed front end portions extending forwardly of the knife, said attachment having in combination a plurality of hollow housings adapted for attachment to corresponding guard fingers of the harvester and having rear portions and forward portions, said rear portion of each of said housings having a recess therein opening to the exterior thereof for receiving the pointed front end portion of the guard fingers therein and also having an opening therein disposed above said recess and communicating with the hollow interior of the housing to permit air to be discharged therethrough in a generally rearwardly direction to sweep the cutter knife, each of said housings having means for releasably attaching the same to such a support structure, an air manifold connectable to a source of air pressure, and a plurality of tubular interconnections each interposed between said manifold and a respective housing and connecting the same in air-communicating relation, whereby said attachment may be readily and easily applied to such a harvester by slipping the housings onto the pointed guard fingers and then securing the housings to the support structure.

2. A bean-saving attachment for use with a soy bean harvester which is provided with a source of pneumatic pressure and which is of the general type employing a crop-receiving and guiding medium and a reciprocating cutter knife which is carried forwardly of such a medium relative to the forward direction of travel of the harvester by suitable support structure and also employing guard fingers having pointed front end portions extending forwardly of the knife, said attachment comprising a plurality of hollow housings for attachment to corresponding guard fingers of the harvester and having rear portions and forward portions, the rear portion of each of said housings having a recess therein opening to the exterior thereof and convergingly tapering in an inward direction of the housing for receiving pointed front end portions of the corresponding guard finger therein and the rear portion of each of said housings also having an opening therein disposed above said recess and communicating with the hollow interior of the housing to permit air to be discharged therethrough in a generally rearwardly direction to sweep the cutter knife and to cause beans lying on the knife to be impelled rearwardly to the crop-receiving medium, a plurality of rigid tubular elements each connected to a corresponding hollow housing in air-communicating relation with the interior thereof and having means adapted for releasable attachment to such support structure of the harvester for retaining the corresponding housing on its respective guard finger, an air manifold adapted for attachment to such a source of pneumatic pressure and being mounted adjacent said tubular elements, and a plurality of releasable connections connecting said manifold with said tubular elements in air-communicating relation, whereby individual housings may be readily and easily removed and replaced.

3. A bean-saving attachment for use with a harvester having a source of pneumatic pressure and being of the general type employing a reciprocating cutter knife, guard fingers extending forwardly of the knife with respect to the forward direction of travel of the harvester, and a crop-receiving and guiding medium disposed rearwardly of the knife, said attachment comprising an air manifold attachable to such a source of pneumatic pressure, a plurality of hollow housings adapted for attachment to such guard fingers and being connected to said manifold in air-communicating relation, each of said housings having an upright surface disposed forwardly of the cutter knife and in close proximity therewith, said surface facing rearwardly toward the knife and extending thereabove and said surface having an opening therein communicating with the hollow interior of said housing and being disposed above the cutter knife, whereby air supplied through said manifold under pressure will be directed through said housings and rearwardly through said openings downwardly onto such a cutter knife and rearwardly thereover to move beans lying on the knife rearwardly to such crop-receiving and guiding medium.

4. The structure recited in claim 3, wherein said opening in said surface is elongated and narrow and is disposed in a generally upright position to direct air passing rearwardly therethrough downwardly onto the knife and rearwardly to the crop-receiving medium to carry beans from the knife to the medium.

References Cited in the file of this patent

UNITED STATES PATENTS

| | | |
|---|---|---|
| 78,709 | Yost | June 9, 1868 |
| 706,367 | Washburn | Aug. 5, 1902 |
| 859,602 | Green | July 9, 1907 |
| 1,122,375 | Engle | Dec. 29, 1914 |
| 1,900,269 | Altgelt et al. | Mar. 7, 1933 |
| 2,459,471 | Tebbetts | Jan. 18, 1949 |
| 2,493,422 | Sartin | Jan. 3, 1950 |
| 2,670,586 | Phillips | Mar. 2, 1954 |